United States Patent
Carter et al.

(10) Patent No.: US 10,035,269 B2
(45) Date of Patent: Jul. 31, 2018

(54) ENHANCED ROBOTIC TEACHING TOOL

(71) Applicant: The Boeing Company, Chicago, IL (US)

(72) Inventors: Camille Doristine Carter, St. Louis, MO (US); Daniel David Bloch, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/856,187

(22) Filed: Sep. 16, 2015

(65) Prior Publication Data

US 2017/0072567 A1 Mar. 16, 2017

(51) Int. Cl.
*B25J 9/16* (2006.01)

(52) U.S. Cl.
CPC .................. *B25J 9/1694* (2013.01)

(58) Field of Classification Search
CPC ..................................... B25J 9/1694
USPC ................................ 700/231–245
See application file for complete search history.

(56) References Cited

U.S. PATENT DOCUMENTS

| | | | | |
|---|---|---|---|---|
| 5,155,423 A * | 10/1992 | Karlen | ............ | B25J 9/04 318/568.1 |
| 6,057,695 A * | 5/2000 | Holt | ............ | B25J 9/1694 324/756.05 |
| 7,200,260 B1 * | 4/2007 | Watanabe | ............ | B25J 9/1692 382/103 |
| 2006/0095159 A1 * | 5/2006 | Desmond | ............ | B82Y 10/00 700/245 |
| 2007/0288124 A1 * | 12/2007 | Nagata | ............ | B25J 9/1694 700/258 |
| 2013/0053866 A1 * | 2/2013 | Leung | ............ | B25J 9/1689 606/130 |
| 2013/0131695 A1 * | 5/2013 | Scarfogliero | ...... | A61B 19/2203 606/130 |
| 2013/0282174 A1 * | 10/2013 | Xi | ............ | B25J 9/1682 700/248 |
| 2014/0094961 A1 * | 4/2014 | Zhao | ............ | B25J 9/1694 700/218 |
| 2016/0176046 A1 * | 6/2016 | Zimmermann | ........ | B25J 9/1633 700/254 |

FOREIGN PATENT DOCUMENTS

JP          2012035391 A          2/2012

OTHER PUBLICATIONS

Combined Search and Examination Report for related British Application No. GB1614071.7; report dated Feb. 7, 2017.

* cited by examiner

*Primary Examiner* — Michael Collins
(74) *Attorney, Agent, or Firm* — Miller, Matthias & Hull LLP

(57) ABSTRACT

A device for aligning a robotic arm with an end-effector is provided. The device may include a spherical tool and a receiver. The spherical tool may include a spherical end portion and a distal base portion configured to releasably couple to the end-effector. The receiver may include a plurality of arms and a proximal base portion configured to releasably couple to the robotic arm. Furthermore, the arms may be configured to receive the spherical end portion and include one or more indicators configured to track alignment between the robotic arm and the end-effector.

18 Claims, 8 Drawing Sheets

ENHANCED ROBOTIC TEACHING TOOL

TECHNICAL FIELD

The present disclosure relates generally to robotic assemblies, and more particularly, to apparatus, systems and methods for aligning a robotic arm with an end-effector.

BACKGROUND

Robotic assemblies, such as robotic arms, are commonly used in a variety of industrial applications. Among other things, robotic arms may be used to perform automated and repetitive functions, such as measuring, manufacturing, positioning, assembling parts, and the like, which may otherwise be cumbersome or more difficult to accomplish manually by hand. Such automated processes not only reduce the amount of tooling involved and the potential for human error, but also increase overall productivity and allow greater flexibility for the task performed. In aircraft manufacturing applications, for instance, robotic arms may be preprogrammed with algorithms and data that are not only capable of automating the installation of a variety of different aircraft components, but also easily reconfigurable to accommodate for case-specific changes in the automated process.

Robotic arms are often configured with a working end that can be fitted with a variety of interchangeable end-effectors or tools designed for different tasks. More particularly, the working end can be provided with a universal connector which uses releasable mechanical or pneumatic mechanisms to couple to different types of end-effectors. Furthermore, robotic arms may be preprogrammed to autonomously interchange between different end-effectors that may be available on one or more tool racks within reach of the robotic arm and readily attachable to the working end of the robotic arm. However, in order to enable a robotic arm to autonomously interchange between different end-effectors, the robotic arm may first need to be taught where the different end-effectors are located relative to the tool racks and/or the base of the robotic arm, and where the working end must be positioned in order to connect to a particular end-effector on the tool rack.

The teaching process is typically performed by an operator who, by hand or by local controls, moves the working end of the robotic arm toward the tool rack and into the appropriate position for attaching to the desired end-effector. Once the working end is properly connected to the end-effector, the resulting spatial pose of the robotic arm relative to its base may be stored in memory. By programming the spatial poses for each individual tool location in the rack, such as in the form of presets, the robotic arm may be able to simply recall any one of the spatial poses and autonomously replace or attach to an end-effector located at that tool location. During the teaching process, however, the operator must properly align the end-effector to the robotic arm, not only using linear motions but also rotational motions, within six degrees of freedom, which can be difficult due to the limited visibility of universal or quick-change connectors. Although some conventional connector plates provide alignment pins to aid the alignment process to some extent, there is still much room for improvement in the teaching process.

Accordingly, there is a need for improved techniques for aligning a robotic arm to a stationary end-effector, which provide simple and yet effective ways to reduce unknowns during the alignment process.

SUMMARY OF THE DISCLOSURE

In accordance with one aspect of the present disclosure, a device for aligning a robotic arm with an end-effector is provided. The device may include a spherical tool and a receiver. The spherical tool may include a spherical end portion and a distal base portion configured to releasably couple to the end-effector. The receiver may include a plurality of arms and a proximal base portion configured to releasably couple to the robotic arm. The arms may be configured to receive the spherical end portion and include one or more indicators configured to track alignment between the robotic arm and the end-effector.

In accordance with another aspect of the present disclosure, a system for programming alignment of a robotic assembly is provided. The system may include an end-effector having a tool-side connection base, a robotic arm having a machine-side connection base that is movable relative to the end-effector into one of a plurality of programmable poses, a spherical tool having a spherical end portion and a distal base portion configured to releasably couple to the tool-side connection base, and a receiver having a plurality of arms and a proximal base portion configured to releasably couple to the machine-side connection base. The arms may be configured to mateably receive the spherical end portion and include one or more indicators configured to indicate alignment between the robotic arm and the end-effector.

In accordance with a further aspect of the present disclosure, a method of aligning a robotic arm with an end-effector is provided. The method may include providing a spherical tool having a spherical end portion and a distal base portion that is releasably coupled to the end-effector, providing a receiver having a plurality of arms, a plurality of indicators and a proximal base portion that is releasably coupled to the robotic arm, adjusting a pose of the robotic arm relative to the end-effector until the indicators indicate proper alignment, and programming the pose of the robotic arm when the indicators indicate proper alignment.

The features, functions and advantages that have been discussed can be achieved independently in various embodiments or may be combined in yet other embodiments, further details of which can be seen with reference to the following description and drawings.

DETAILED DESCRIPTION

Although the following sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent other than the language of the claims. To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
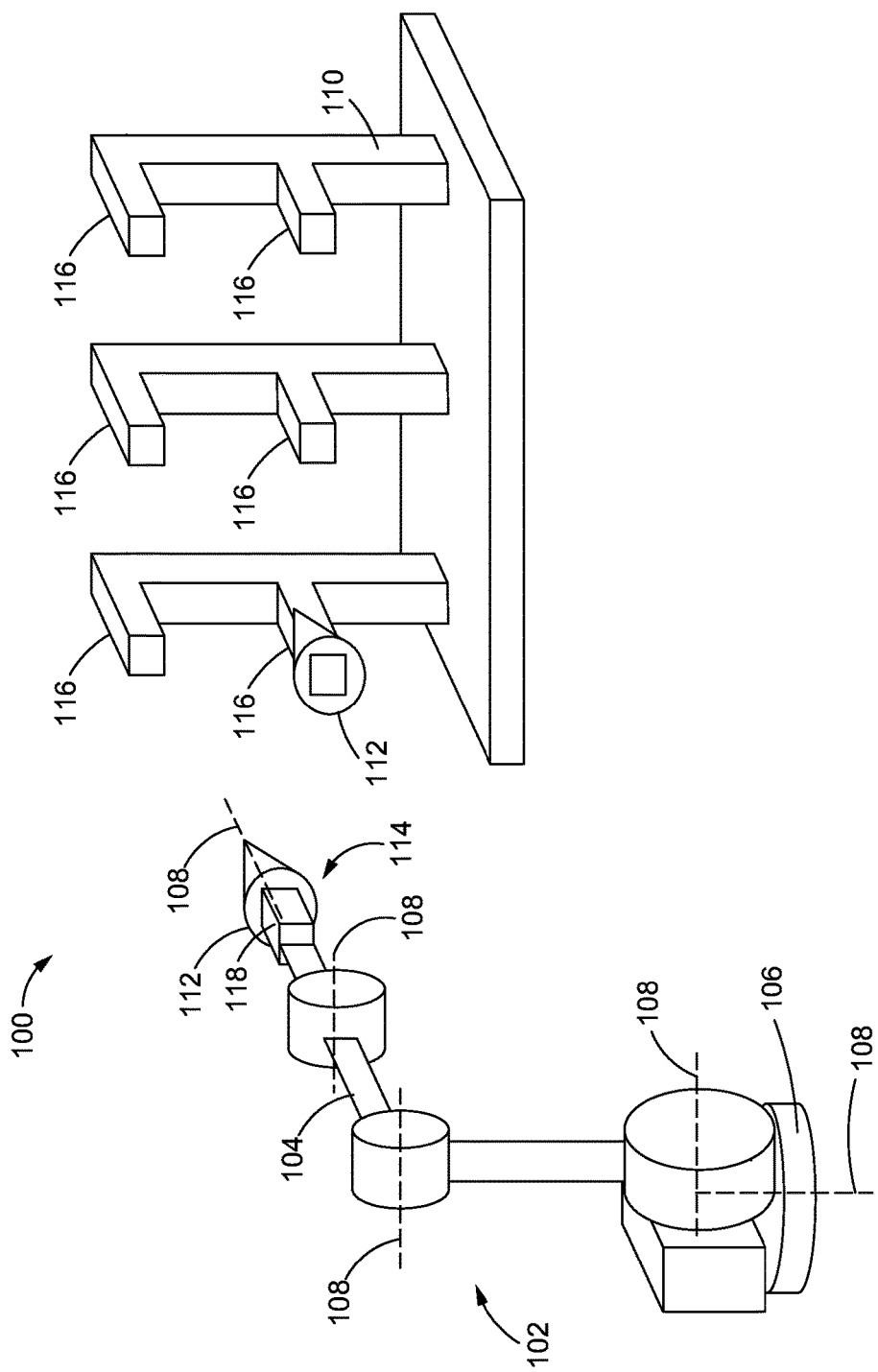
FIG. 1 is a perspective view of one exemplary alignment system provided in accordance with the teachings of the present disclosure.

Referring now to FIG. 1, one exemplary embodiment of an alignment system 100 for use with a robotic assembly 102 is schematically illustrated. As shown, the robotic assembly 102 may include a robotic arm 104 that is rotatable, pivotable or otherwise movable relative to a base 106 about one or more axes 108 thereof. The robotic assembly 102 may also be movable relative to one or more tool racks 110, each of which may carry a plurality of different tools or end-effectors 112 that are attachable to a working end 114 of the robotic arm 104. More specifically, the tool rack 110 may include one or more fixed posts 116 configured to support and position each end-effector 112 in a manner that facilitates the ability of the robotic arm 104 to autonomously reach and connect to an end-effector 112, and replace a previously connected end-effector 112. Furthermore, each available end-effector 112 may be designated to an individual post 116 of the tool rack 110 such that, once programmed or taught, the robotic arm 104 may autonomously retrieve or replace different end-effectors 112 for different tasks.

Figure 2:
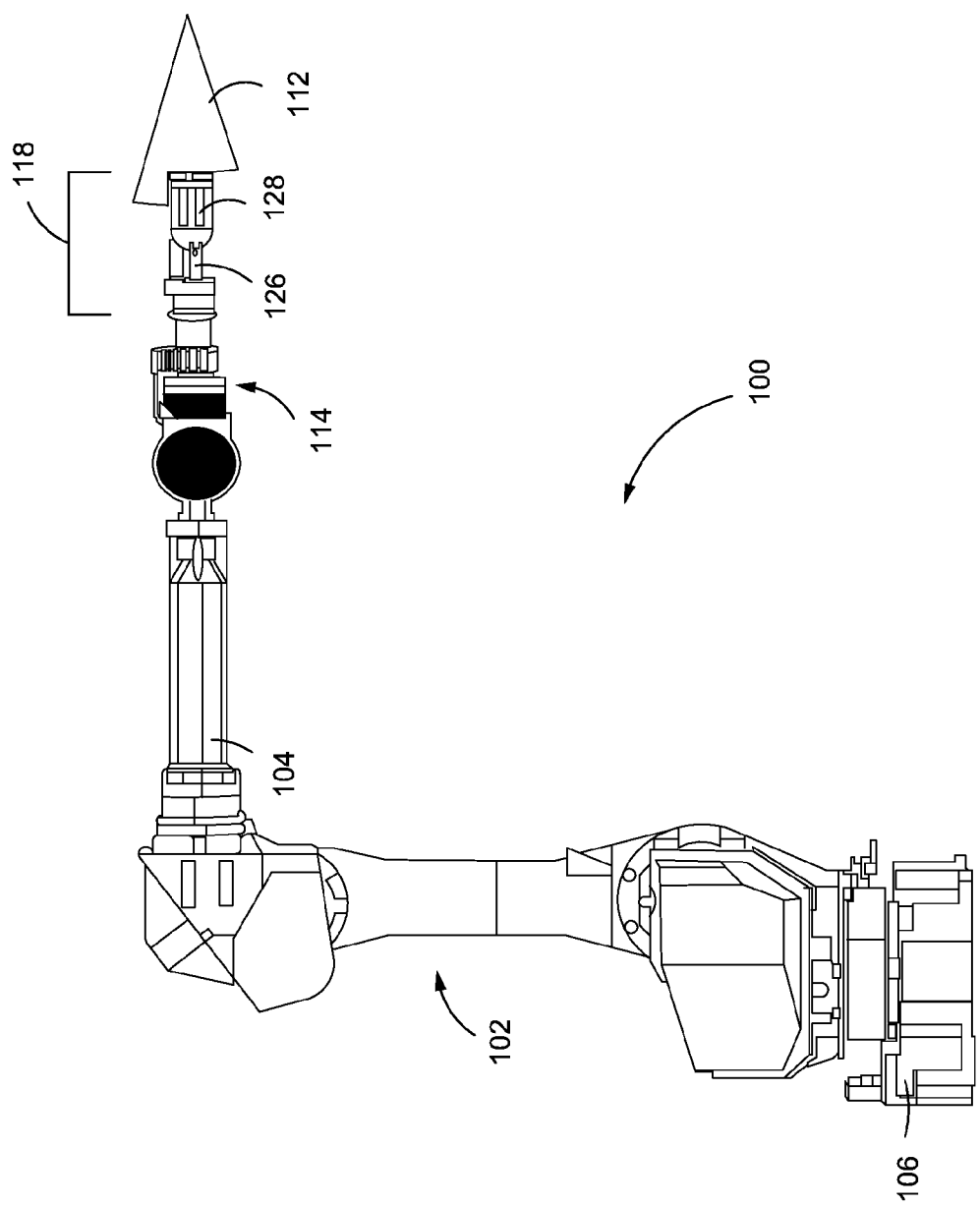
FIG. 2 is a side plan view of one exemplary alignment system of the present disclosure.

Turning to FIG. 2, another exemplary embodiment of an alignment system 100 for a robotic assembly 102 is provided in more detail. In the robotic assembly 102 shown, the working end 116 of the robotic arm 104 may be configured to mateably couple to one or more interchangeable tools or end-effectors 112 designed for different applications. For example, the robotic arm 104 may be coupled to the appropriate end-effector 112 and programmed with one or more algorithms to perform specified tasks, such as those relating to measuring, manufacturing, positioning, assembling, installing, or the like. As shown, the alignment system 100 may further provide an alignment device 118, which may be temporarily attached between the robotic arm 104 and the end-effector 112, such as during an alignment procedure, and used to properly align the robotic arm 104 with the end-effector 112. Once properly aligned, the alignment device 118 may be removed and the robotic arm 104 may be taught or programmed to the aligned position, offset by the predefined dimensions of the alignment device 118.

Figure 3:
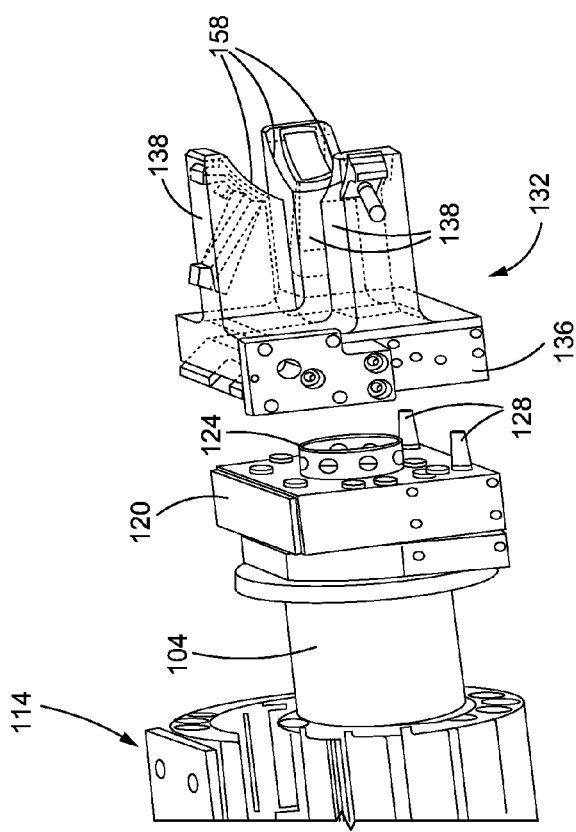
FIG. 3 is a perspective view of one exemplary receiver of the present disclosure.
Figure 4:
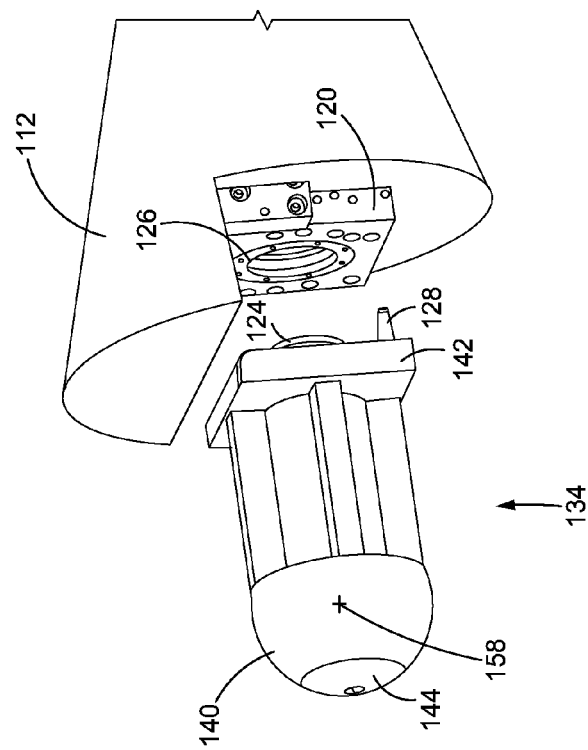
FIG. 4 is a perspective view of one exemplary spherical tool of the present disclosure.

As further shown in FIGS. 3 and 4, the alignment device 118 of FIG. 2 may be disposed between a machine-side connector 120 and a tool-side connector 122. The machine-side connector 120 may be disposed at the distal end of the robotic arm 104 and configured to mateably couple to the counterpart, tool-side connector 122 disposed at the proximal end of the end-effector 112. As shown in FIGS. 3 and 4, for example, the machine-side connector 120 may include a male-type cylindrical key 124 sized and configured to be received within the female-type receptacle 126 of the tool-side connector 122. The machine-side connector 120 may further include one or more alignment pins 128 designed to be received within corresponding alignment holes 130 of the tool-side connector 122. Furthermore, the connectors 120, 122 may be designed with a universal or commercial fitment such that any one of a plurality of different end-effectors 112 with compatible tool-side connectors 122 can be used on the given robotic arm 104. In other alternatives, the connectors 120, 122 may be customized for specific applications rather than for commercial use. The tool-side connector 122 may also be releasably locked onto the machine-side connector 120 using mechanical, pneumatic, electrical and/or magnetic locking means.

The alignment device 118 of FIG. 2 may include a receiver 132 configured to couple to the machine-side connector 120 and a spherical tool 134 configured to couple to the tool-side connector 122. As shown, the receiver 132 of FIG. 3 may include a proximal base portion 136 and a plurality of arms 138 distally extending therefrom, while the spherical tool 134 of FIG. 4 may include a spherical end portion 140 and a distal base portion 142 coupled thereto. The proximal base portion 136 may be designed to mimic the tool-side connector 122 of the end-effector 112 and interface with the machine-side connector 120. For example, the proximal base portion 136 may include a female-type receptacle 126 and alignment holes 130 configured to mateably receive the corresponding male-type cylindrical key 124 and alignment pins 128 of the machine-side connector 120. Similarly, the distal base portion 142 of the spherical tool 134 may be designed to mimic the machine-side connector 120 of the robotic arm 104 and interface with the tool-side connector 122. Correspondingly, the distal base portion 142 may include a male-type cylindrical key 124 and alignment pins 128 configured to be mateably received within the female-type receptacle 126 and alignment holes 130 of the tool-side connector 122.

Figure 5:
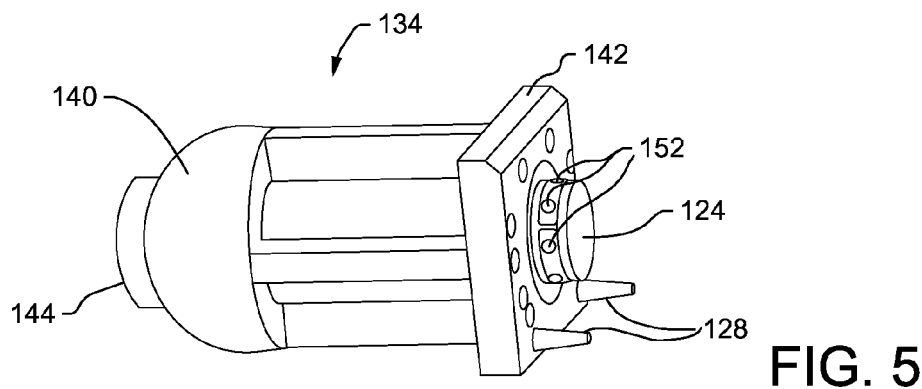
FIG. 5 is a perspective view of the spherical tool of FIG. 4.
Figure 6:
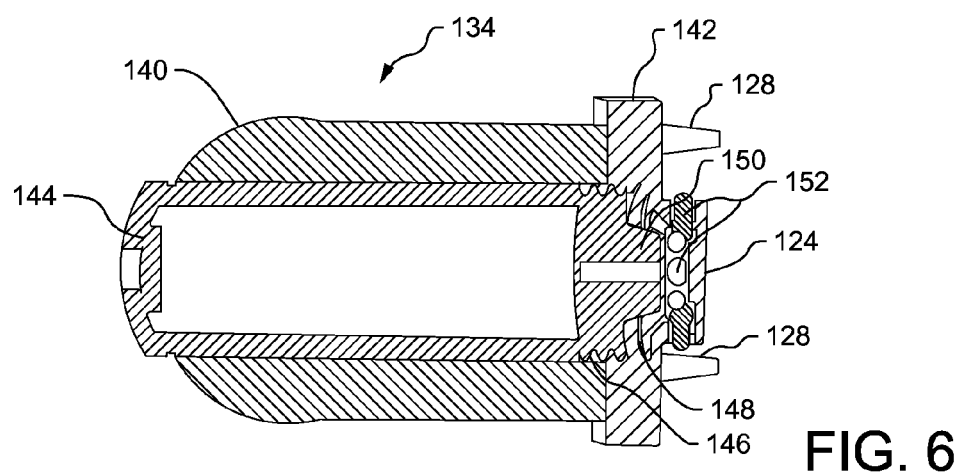
FIG. 6 is a cross-sectional view of the locking cylinder of the spherical tool of FIG. 4.
Figure 7:
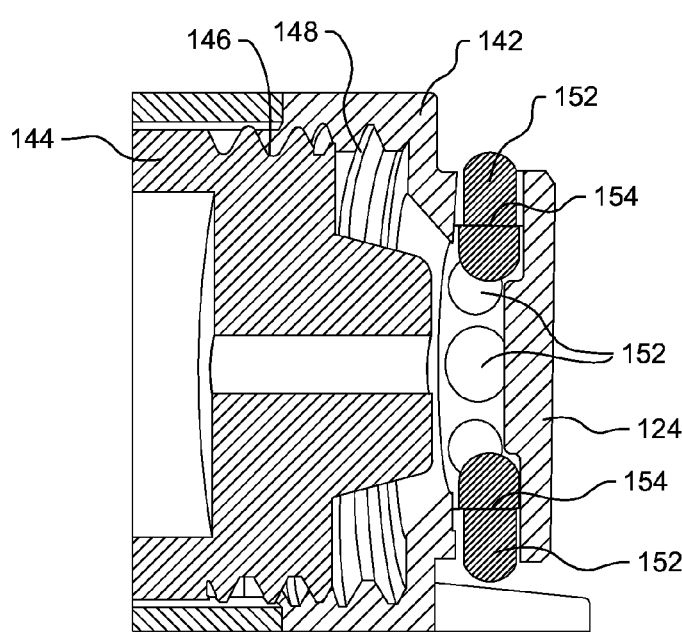
FIG. 7 is a cross-sectional view of the locking pins of the spherical tool of FIG. 4.

Turning now to FIGS. 5-7, one exemplary embodiment of the spherical tool 134 is shown in more detail. As shown, the spherical tool 128 may include a locking cylinder 144 that is coaxially disposed therethrough, extending between the spherical end portion 140 and the distal base portion 142, and substantially flush with the spherical end portion 140. Moreover, as shown in the cross-sectional views of FIGS. 6 and 7, the distal end of the locking cylinder 144 may include a threaded interface 146 designed to interact with a corresponding threaded inner surface 148 of the distal base portion 142. The locking cylinder 144 may further include a tapered tip 150 designed to mechanically interact with one or more locking pins 152 radially disposed about the cylindrical key 124 of the distal base portion 142. The locking cylinder 144 may be axially movable relative to the spherical tool 134 to selectively engage the locking pins 152 between locked and unlocked positions. More particularly, in the locked position, the locking pins 152 may be radially extended from the cylindrical key 124 to engage the inner walls of the receptacle 126, while in the unlocked position, the locking pins 152 may be radially retracted within the cylindrical key 124 to release the cylindrical key 124 from the tool-side connector 122.

In the embodiment shown in FIGS. 5-7, the distal base portion 142 may be locked into the receptacle 126 of the tool-side connector 122 by axially extending and/or rotating the locking cylinder 144 relative to the spherical tool 134 until the tapered tip 150 abuts and extends the locking pins 152 radially outwardly. As shown in more detail in FIG. 7, each locking pin 152 may provide a stepped interface 154 which retains the locking pins 152 within the cylindrical key 124. Conversely, in order to unlock the distal base portion 142 from the receptacle 126, the locking cylinder 144 may be axially retracted and/or rotated relative to the spherical tool 134 until the tapered tip 150 no longer contacts the locking pins 152, or at least until the locking pins 152 are sufficiently retracted to release the cylindrical key 124 from the receptacle 126. Although not shown, the locking pins 152 may further be biased toward the center of the cylindrical key 124 and into the fully refracted position using coil springs, leaf springs, or other biasing mechanisms commonly used in the art. Furthermore, axial and/or rotational actuation of the locking cylinder 144 may be manually engaged or selectively engaged using mechanical, pneumatic, electrical and/or magnetic actuating means.

Referring back to FIGS. 3 and 4, the arms 138 of the receiver 132 may be configured to interface with the spherical end portion 140 of the spherical tool 134. For instance, the spherical end portion 140 of the spherical tool 134 may provide a spherical outer surface that is defined about a common tool center point 156. Correspondingly, the ends of the arms 138 may have inwardly contoured surfaces 158 that are sized and shaped to collectively receive the spherical outer surface of the spherical end portion 140 and make uniform contact therewith when appropriately positioned. Furthermore, the contoured surfaces 158 may be configured to receive the outer surface of the spherical end portion 140 in a manner which enables the receiver 132 to rotate and/or pivot about the spherical end portion 140 and its tool center point 156 while maintaining substantially uniform contact therewith. Although the interface between the receiver 132 and the spherical tool 134 shown in FIGS. 3 and 4 is spherical, it will be understood that other interface types, such as cylindrical, conical, elliptical, or the like, may similarly be implemented to provide comparable results.

Figure 8:
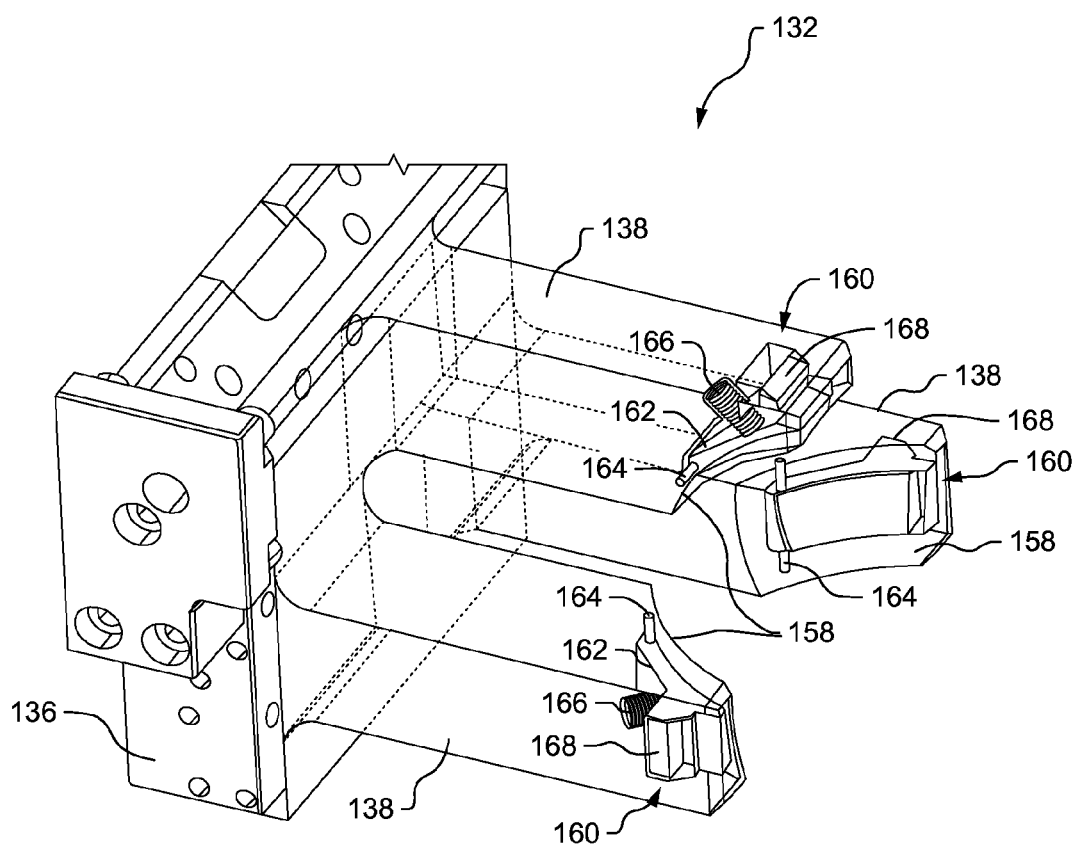
FIG. 8 is a perspective view of the receiver of FIG. 3.

Turning to FIG. 8, one exemplary embodiment of the receiver 132 is provided in more detail. In the embodiment shown, the receiver 132 may include multiple arms 138, such as three arms 138, distally extending from the proximal base portion 136, each arm 138 having a contoured surface 158 for receiving the spherical end portion 140 of the spherical tool 134. In addition, the end of each arm 138 may include one or more indicators 160 configured to track, monitor or otherwise provide feedback regarding the alignment between the robotic arm 104 and the end-effector 112, such as a center point alignment and a robotic arm alignment. In terms of center point alignments, or alignments made via linear robotic movements to align the center point of the receiver arms 138 with the tool center point 156 of the spherical tool 134, the indicators 160 may be used to indicate whether the spherical end portion 140 is sufficiently and uniformly received within the contoured surfaces 158 of all receiver arms 138. In terms of arm alignments, or alignments made via rotational robotic movements to align the rotational pose of the receiver arms 138 about the tool center point 156 of the spherical tool 134 while maintaining the center point alignment, the indicators 160 may be used to indicate whether the angular or rotational position of the receiver 132 relative to the tool center point 156 of the spherical tool 134, or the spatial pose, is aligned as desired. In FIG. 8 for instance, the center point alignment may be tracked by the indicators 160, while the arm alignment may be tracked based on comparisons between one or more of the edges of the arms 138 and any reference points which may be provided on the outer surface of the spherical end portion 140.

As shown in FIG. 8, each indicator 160 may include a mechanical rocker 162 that is in communication with the contoured surface 158 and pivotally displaceable about a rocker axis 164 within the receiver arm 138 between a raised position and a deflected position. The displacement of the rocker 162 may depend on interactions with the spherical end portion 140 and correspond to the degree of linear motion required by the robotic assembly 102 to achieve center point alignment between the robotic arm 104 and the end-effector 112. Each rocker 162 may also include a biasing mechanism 166 which biases the rocker 162 into the raised position while enabling the rocker 162 to be deflected when placed into contact with the spherical end portion 140. Furthermore, each indicator 160 may include at least one alignment marker 168 which moves with the rocker 162 and provides feedback regarding the alignment between the arm 104 and the end-effector 112. For example, the marker 168 may be configured such that the marker 168 is clearly visible and substantially flush with the exterior surface of the receiver arm 138 when the rocker 162 is sufficiently pressed into the deflected position by the spherical end portion 140. Conversely, the marker 168 may not be clearly visible or skewed relative to the arm 138 if the rocker 162 is not sufficiently pressed into the deflected position.

Referring to FIGS. 9-13, variations of the indicators 160 of FIG. 8 which may be implemented into the receiver arms 138 of a receiver 132 are provided. For instance, the indicator 160 in FIGS. 9 and 10 may provide a second, proximal alignment marker 170 in addition to the first, distal alignment marker 168 to make it possible to track alignment even when view of the distal alignment marker 168 is obstructed. Much like the distal alignment marker 168, the proximal alignment marker 170 may also be coupled to the rocker 162 and directly movable therewith. The proximal alignment marker 170 may also be configured to be substantially flush with the exterior surface of the receiver arm 138 when the rocker 162 is sufficiently pressed into the deflected position by the spherical end portion 140, but otherwise raised or extended relative to the arm 138. Specifically, the marker 170 may be extended and skewed relative to the arm 138 if the rocker 162 is not sufficiently pressed into the deflected position. As further shown in FIG. 10, the indicator 160 may also include a scale 172 which may be used as a reference for determining the relative displacement of the distal alignment marker 168, and thus, the degree of center point alignment or misalignment between the receiver arm 138 and the spherical end portion 140.

Figure 9:
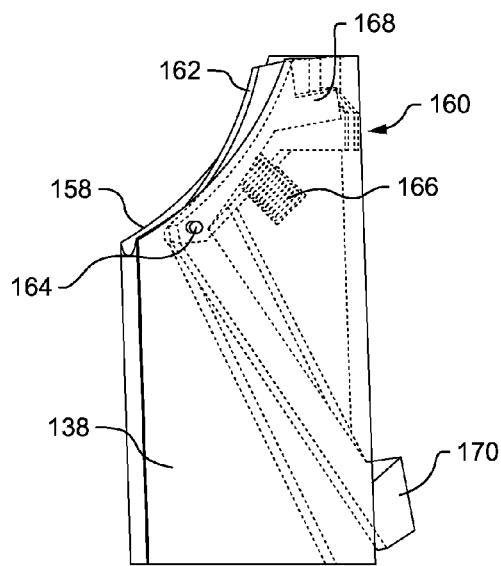
FIG. 9 is a perspective view of another exemplary indicator of the present disclosure.
Figure 10:
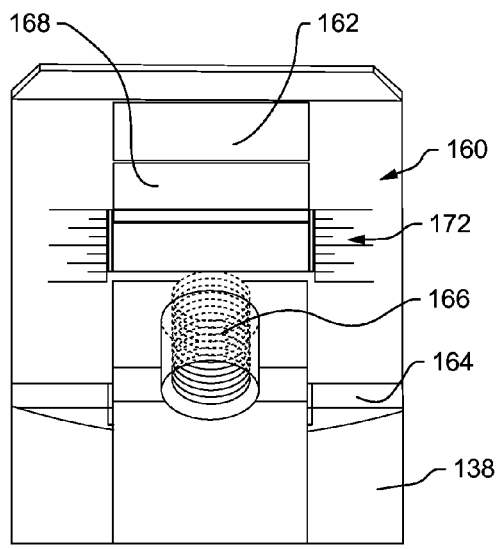
FIG. 10 is a perspective view of the indicator of FIG. 9.
Figure 11:
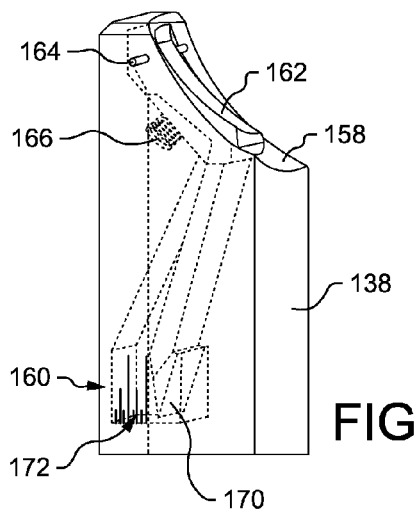
FIG. 11 is a perspective view of another exemplary indicator of the present disclosure.
Figure 12:
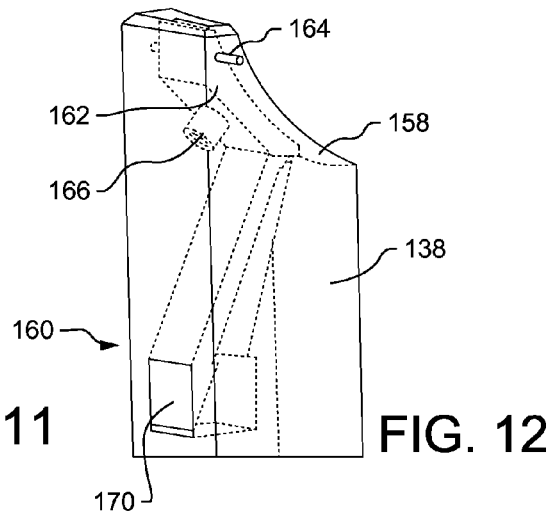
FIG. 12 is a perspective view of the indicator of FIG. 11.

The embodiment of FIGS. 11 and 12 illustrates a further variation of the indicators 160 of FIGS. 8-10. In contrast to the rockers 162 of FIGS. 8-10, the rocker 162 in FIGS. 11 and 12 may be pivotally displaceable about a rocker axis 164 that is distally disposed relative to the contoured surface 158. The general mechanics of the indicator 160 in FIGS. 11 and 12 may remain the same, where the rocker 162 is in communication with the contoured surface 158 and displaceable between raised and deflected positions based on interactions with the spherical end portion 140. Furthermore, the indicator 160 in FIGS. 11 and 12 may be provided with one proximal alignment marker 170 and omit the distal alignment markers 168 of FIGS. 8-10. Still further, and in contrast to the proximal alignment marker 170 of FIGS. 9 and 10, movement of the proximal alignment marker 170 in FIGS. 11 and 12 may be limited to the exterior surface of the receiver arm 138. For example, the proximal alignment marker 170 may be configured to be substantially flush with the exterior surface of the receiver arm 138 when the rocker 162 is sufficiently pressed into the deflected position by the spherical end portion 140, but otherwise hidden or tucked within the arm 138. Additionally, the indicator 160 may also include a scale 172 disposed relative to the proximal alignment marker 170 to be used as a reference for determining the degree of alignment or misalignment.

Figure 13:
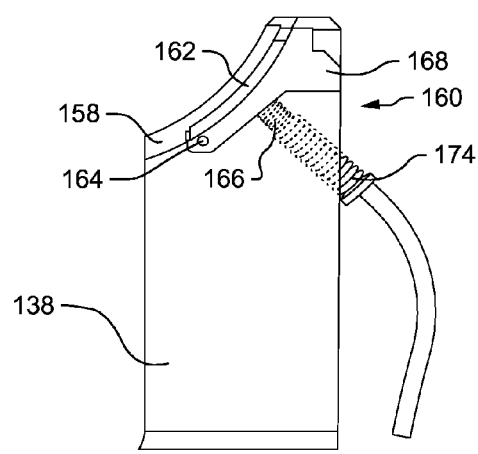
FIG. 13 is a perspective view of yet another exemplary indicator of the present disclosure.

Still further, the embodiment of FIG. 13 illustrates another variation of the indicators 160 of FIGS. 8-12. Similar to the indicator 160 shown in FIG. 8, the rocker 162 in FIG. 13 may be configured to be pivotally displaceable about a rocker axis 164 that is proximally situated relative to the contoured surface 158. Also similar to FIG. 8, the indicator 160 of FIG. 13 may be provided with a distal alignment marker 168 that is visible from an exterior surface of the receiver arm 138. In contrast to previous embodiments, however, the indicator 160 of FIG. 13 may further include one or more sensing devices 174 configured to detect the displacement of the rocker 162 and generate one or more outputs indicative of the corresponding alignment and/or an offset distance associated with the end-effector 112. As shown in FIG. 13, for example, the sensing device 174 may employ a pressure sensor or a linear encoder that is coupled to the rocker 162 and/or the biasing mechanism 166. Other types of sensing devices 174 and other arrangements for sensing displacement and/or alignment can also be used. Furthermore, the outputs generated by the sensing device 174 may be provided mechanically, electrically, pneumatically, magnetically, or combinations thereof, as output signals or any other forms of information indicative of the alignment between the receiver 132 and the spherical tool 134.

Figure 14:
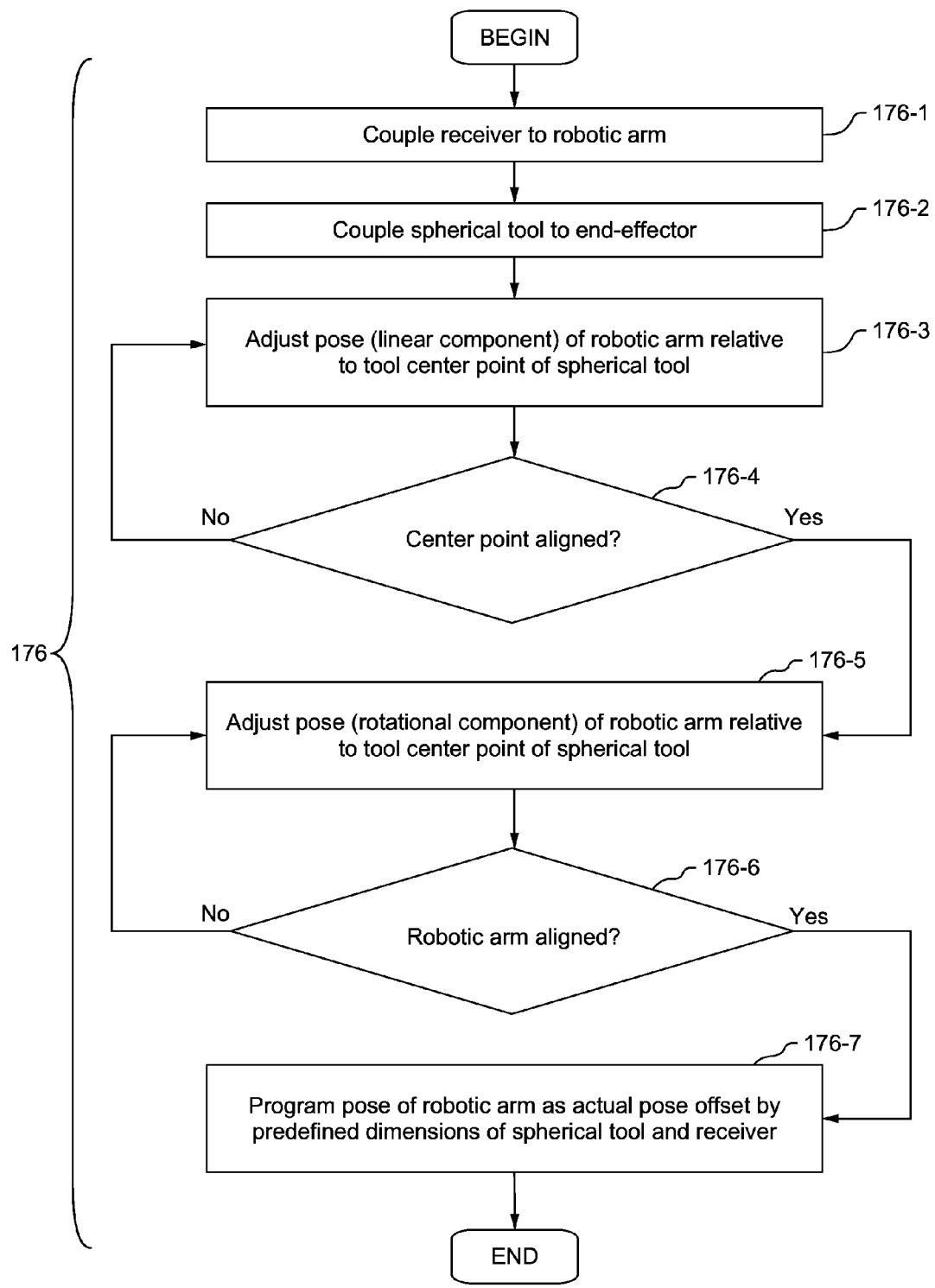
FIG. 14 is a diagrammatic view of one exemplary alignment method of the present disclosure.

Turning now to FIG. 14, one exemplary method 176 of aligning a robotic arm 104 with an end-effector 112 is diagrammatically shown. As shown, the method 176 in block 176-1 may initially couple the receiver 132 to the robotic arm 104. With further reference to FIG. 3, for example, the female-type receptacle 126 and alignment holes 130 of the proximal base portion 136 of the receiver 132 may be aligned and secured to the male-type cylindrical key 124 and the alignment pins 128 of the machine-side connector 120. Similarly, the method 176 in block 176-2 may couple the spherical tool 134 to the end-effector 112. As shown in FIG. 4, for example, the female-type receptacle 126 and alignment holes 130 of the tool-side connector 122 of the end-effector 112 may be aligned and secured to the male-type cylindrical key 124 and the alignment pins 128 of the distal base portion 142 of the spherical tool 134. Once each of the receiver 132 is coupled to the robotic arm 104 and the spherical tool 134 is coupled to the end-effector 112, the spatial pose of the robotic arm 104 may be adjusted relative to the tool center point 156 of the spherical tool 134 to begin the alignment procedure.

Figure 15:
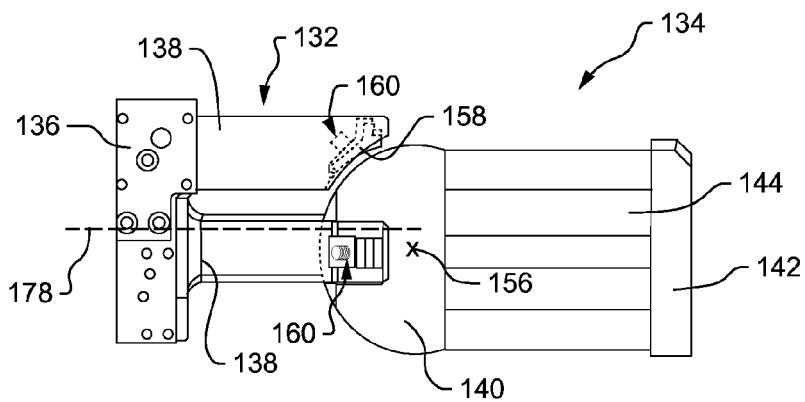
FIG. 15 is a side plan view of one exemplary alignment device of the present disclosure being used to align a robotic arm to an end-effector using linear robotic movements.

As shown in FIG. 14, the method 176 in block 176-3 may adjust the linear position of the robotic arm 104, or the linear component of the spatial pose thereof, relative to the spherical tool 134 until at least center point alignment is achieved, or until at least the tool center point 156 of the spherical tool 134 is coincident with the center point of the receiver arms 138. Moreover, in certain embodiments, the center point alignment may serve to position the receiver arms 138 evenly about the tool center point 156 of the spherical end portion 140, irrespective of the relative rotational positions of the robotic arm 104 and the end-effector 112. As illustrated in FIG. 15, the linear position of the robotic arm 104 may be adjusted relative to the end-effector 112 until the spherical end portion 140 is sufficiently received within each of the arms 138 of the receiver 132. The method 176 in block 176-4 may determine whether center point alignment has been achieved based on feedback provided by the indicators 160 of the receiver 132. Center point alignment is achieved if, for example, all indicators 160 indicate that the spherical end portion 140 is sufficiently received within the receiver arms 138. If, however, any one of the indicators 160 indicates misalignment, the position of the robotic arm 104 may be readjusted in block 176-3, for instance, in the direction suggested by the misaligned indicator 160, until proper center point alignment is achieved.

Figure 16:
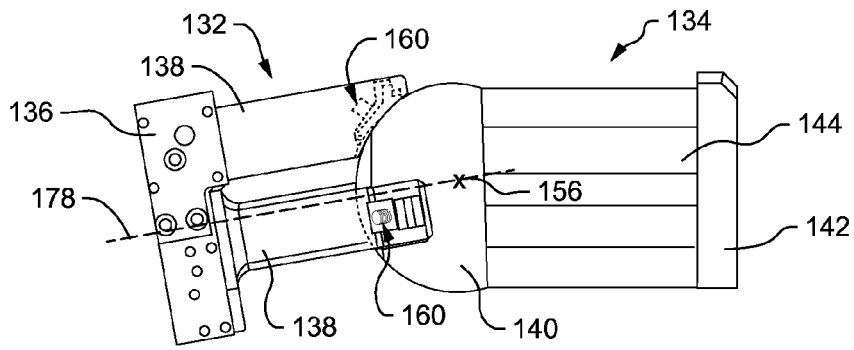
FIG. 16 is a side plan view of the alignment device of FIG. 15 being used to align the robotic arm to the end-effector using rotational robotic movements.

The method 176 in block 176-5 may also adjust the spatial pose of the robotic arm 104 relative to end-effector 112 until the desired arm alignment is achieved, or until the rotational position thereof is aligned or set to the desired position. If the center point alignment has already been achieved, the robotic arm 104 may be adjusted using only rotational movements, such as about the tool center point 156, so as not to upset the center point alignment. As illustrated in FIG. 16, for example, the robotic arm 104 may be rotated about its axis 178 and/or pivoted relative to the tool center point 156 of the spherical end portion 140 in order to achieve the desired arm alignment with the end-effector 112. In other embodiments, however, the desired arm alignment may be achieved independently from the center point alignment, and thereby employ a combination of rotational and linear robotic movements. In either case, the method 176 in block 176-6 may determine whether the desired arm alignment has been achieved, for example, based on feedback provided by indicators 160 capable of tracking arm alignment and/or based on the positions of the arms 138 of the receiver 132 relative to reference points disposed on the outer surface of the spherical end portion 140. The desired arm alignment is established if, for example, all indicators 160 and/or receiver arms 138 indicate that the robotic arm 104 is axially and pivotally positioned as desired relative to the end-effector 112. If any of the indicators 160 or arms 138 indicate misalignment, the rotational position of the robotic arm 104 may be readjusted in block 176-5.

Figure 17:
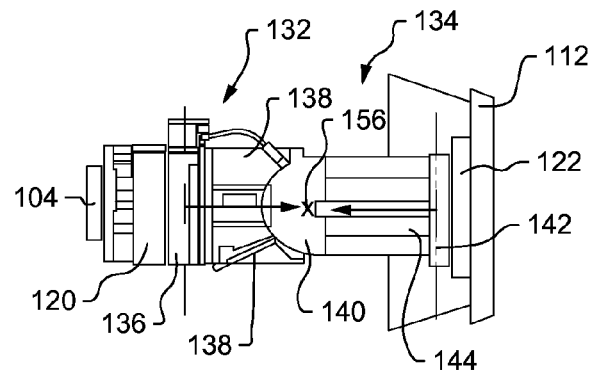
FIG. 17 is a side plan view of the alignment device of FIG. 15 being used to program the aligned pose of the robotic arm.

If the spatial pose of the robotic arm 104, in terms of both linear and rotational components, is adequately aligned with the end-effector 112, the method 176 in block 176-7 may program, or retrievably store in memory, the pose of the robotic arm 104 as a reference for future automated operations involving the given end-effector 112 or other compatible tools. Moreover, in programming the pose of the robotic arm 104, the actual pose of the robotic arm 104 may be adjusted to correct for the size or length of the alignment device 118, which is only installed during the alignment procedure and not otherwise used. As illustrated in FIG. 17, for example, the aligned pose of the robotic arm 104 may ultimately be determined by offsetting the actual pose by the predefined length of the alignment device 118, and any other predefined dimensions of the alignment device 118 relative to the tool center point 156. Once the aligned pose is finally calculated or determined, the appropriate commands for recalling that aligned pose may be programmed or stored in memory for future reference. In still further modifications, the robotic arm 104 may also be capable of autonomously locate different end-effectors 112 within a given tool rack 110, and autonomously learn the different spatial poses necessary to reach the different end-effectors 112.

It will be appreciated that the foregoing description provides examples of the disclosed apparatus, systems and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A device for aligning a robotic arm with an end-effector mounted on a tool rack provided independent of the robotic arm, the device comprising:
  a spherical tool having:
    a distal base portion releasably coupled to the end effector, so that the spherical tool is supported by the tool rack independent of the robotic arm; and
    a spherical end portion coupled to the distal base portion and having an outer surface defining a tool center point; and
  a receiver having:
    a proximal base portion releasably coupled to the robotic arm, so that the receiver is supported by the robotic arm independent of the tool rack and the spherical tool;
    a plurality of arms coupled to the proximal base portion and including arm surfaces, each arm surface having a shape configured to mateably receive the outer surface of the spherical end portion so that the arm surfaces define a receiver arm center point; and
    one or more indicators configured to indicate when the arm surfaces of the receiver engage the outer surface of the spherical tool, thereby indicating that the tool center point is aligned with the receiver arm center point.

2. The device of claim 1, wherein the distal base portion includes a plurality of locking pins configured to interface with the end-effector, and the proximal base portion includes a connector configured to receive a plurality of locking pins of the robotic arm.

3. The device of claim 2, wherein the spherical tool further includes a locking cylinder coaxially disposed therethrough, the locking cylinder being axially movable relative to the spherical tool and configured to selectively engage the locking pins of the distal base portion into a locked position.

4. The device of claim 1, wherein the distal base portion is configured to releasably couple to a tool-side connection base of the end-effector, and the proximal base portion is configured to releasably couple to a machine-side connection base of the robotic arm.

5. The device of claim 1, wherein the arm surfaces of the receiver are further configured to slide along the spherical surface, thereby to rotate the receiver about the tool center point.

6. The device of claim 1, wherein the indicators are pivotally displaceable relative to the arms based on interactions with the spherical end portion, the displacement of the indicators corresponding to at least center point alignment between the robotic arm and the end-effector.

7. The device of claim 6, wherein the indicators further include one or more sensing devices configured to detect the displacement and generate one or more outputs indicative of the corresponding alignment and an offset distance associated with the end-effector.

8. A system for programming alignment of a robotic assembly, comprising:
  an end-effector mounted on a tool rack and having a tool-side connection base;
  a robotic arm provided independent of the tool rack and having a machine-side connection base that is movable relative to the end-effector into one of a plurality of programmable poses;
  a spherical tool having:
    a distal base portion releasably coupled to the tool-side connection base of the end effector, so that the spherical tool is supported by the tool rack independent of the robotic arm; and
    a spherical end portion coupled to the distal base portion and having an outer surface defining a tool center point; and
  a receiver having:
    a proximal base portion releasably coupled to the robotic arm, so that the receiver is supported by the robotic arm independent of the tool rack and the spherical tool;
    a plurality of arms coupled to the proximal base portion and including arm surfaces, each arm surface having a shape configured to mateably receive the outer surface of the spherical end portion so that the arm surfaces define a receiver arm center point; and
    one or more indicators configured to indicate when the arm surfaces of the receiver engage the outer surface of the spherical tool, thereby indicating that the tool center point is aligned with the receiver arm center point.

9. The system of claim 8, wherein the distal base portion includes a plurality of locking pins and an alignment pin configured to interface with the end-effector, and the proximal base portion includes a connector configured to receive a plurality of locking pins and an alignment pin of the robotic arm.

10. The system of claim 9, wherein the spherical tool further includes a locking cylinder coaxially disposed therethrough, the locking cylinder being axially movable relative to the spherical tool and configured to selectively engage the locking pins of the distal base portion into a locked position.

11. The system of claim 9, wherein each of the distal base portion and the proximal base portion is provided with one of a pneumatic locking mechanism and a mechanical locking mechanism.

12. The system of claim 8, wherein the arm surfaces of the receiver are further configured to slide along the spherical surface, thereby to rotate the receiver about the tool center point.

13. The system of claim 8, wherein the indicators are displaceable relative to the arms based on interactions with the spherical end portion, the displacement of the indicators corresponding to at least center point alignment between the robotic arm and the end-effector.

14. The system of claim 13, wherein the robotic arm is manually adjustable until the indicators indicate proper alignment between the robotic arm and the end-effector, and the pose of the robotic arm is programmable when the indicators indicate proper alignment.

15. The system of claim 13, wherein the indicators further include one or more sensing devices configured to detect the displacement and generate one or more electrical signals indicative of the corresponding alignment.

16. A method of aligning a robotic arm with an end-effector mounted on a tool rack provided independent of the robotic arm, the method comprising:
   providing a spherical tool having a distal base portion releasably coupled to the end effector, so that the spherical tool is supported by the tool rack independent of the robotic arm, and a spherical end portion coupled to the distal base portion and having an outer surface defining a tool center point;
   providing a receiver having a proximal base portion releasably coupled to the robotic arm, so that the receiver is supported by the robotic arm independent of the tool rack and the spherical tool, a plurality of arms coupled to the proximal base portion and including arm surfaces, each arm surface having a shape configured to mateably receive the outer surface of the spherical end portion so that the arm surfaces define a receiver arm center point, and a plurality of indicators configured to indicate when the arm surfaces of the receiver engage the outer surface of the spherical tool, thereby indicating that the tool center point is aligned with the receiver arm center point;
   adjusting a pose of the robotic arm relative to the end-effector until the indicators indicate proper alignment; and
   programming the pose of the robotic arm when the indicators indicate proper alignment.

17. The method of claim 16, wherein proper alignment is indicated based on a linear component and a rotational component, the linear component being aligned when the spherical end portion is sufficiently received within each of the arms, and the rotational component being aligned when the arms are in a desired orientation relative to a tool center point of the spherical end portion.

18. The method of claim 16, wherein the indicators are pivotally displaceable relative to the arms based on interactions with the spherical end portion, the displacement of the indicators corresponding to at least center point alignment between the robotic arm and the end-effector.

* * * * *